United States Patent [19]

Daniels

[11] 4,078,511

[45] Mar. 14, 1978

[54] SELF-STEERING APPARATUS FOR SAILBOATS

[75] Inventor: Derek K. Daniels, Nottingham, England

[73] Assignee: Regent Marine & Instrumentation, Inc., Buffalo, N.Y.

[21] Appl. No.: 729,719

[22] Filed: Oct. 5, 1976

[51] Int. Cl.² .......................................... B63M 25/04
[52] U.S. Cl. .................................. 114/144 C; 114/39
[58] Field of Search ............... 114/39, 144 R, 144 C, 114/146, 163

[56] References Cited

U.S. PATENT DOCUMENTS

| 3,180,298 | 4/1965 | Gianoli | 114/144 C |
| 3,831,542 | 8/1974 | Krebs | 114/144 C |

FOREIGN PATENT DOCUMENTS

| 1,326,020 | 8/1973 | United Kingdom | 114/144 C |

Primary Examiner—Trygve M. Blix
Assistant Examiner—D. W. Keen
Attorney, Agent, or Firm—Christel & Bean

[57] ABSTRACT

A wind powered, self-steering device for sailboats of the type employing a main steering rudder and auxiliary steering rudder. The wind vane pivots about an axis that is tiltably adjustable with respect to the horizontal so as to adjust the sensitivity thereof in accordance with the type of keel associated with the boat its point of sailing and prevailing wind and sea conditions. The wind vane axis is also rotatably adjustable with respect to the center line of the sailboat to provide course adjustment. When engaged for operation, the wind vane senses the relative shipwind direction and, when a boat is off course, translates the wind forces on the wind vane into corrective movements of the auxiliary rudder to return the sailboat to course. The present invention is further characterized by the fact that a transmission is provided to transmit the pivotal movements of the wind vane to the auxiliary rudder in a range of settable gear ratios which can be determined independently of and in addition to the angle of tilt selected for the wind vane and sensitivity corresponding thereto. The present invention is further characterized by an auxiliary rudder blade subassembly having a pendulum body pivotally mounted on an axis at an angle to the horizontal. The pendulum carries the auxiliary rudder blade which pivots about an axis on the pendulum which axis is oblique to the axis about which the pendulum rotates.

15 Claims, 8 Drawing Figures

SELF-STEERING APPARATUS FOR SAILBOATS

BACKGROUND OF THE INVENTION

As is well known to both commercial and sport sailors, it is frequently desirable that a sailboat have capacity to steer itself, thereby relieving the helmsman for other duties or rest. Such occasions might arise during lengthly ocean passages, when sailing with a shorthanded crew, or, particularly, when sailing single handed. In all such circumstances, it is essential that the self-steering device have complete control of the helm to prevent undesired motion of the sailboat or deviations from a preset course.

Numerous efforts have been made to develop self-steering systems for sailboats, for the general purpose described as well as for other purposes. One category of such mechanisms, for example, has the purpose of maintaining a boat on a given course with a fixed compass heading. As mechanisms in this category generally require auxiliary power responsive to control by some compass device, they are of no interest to the present invention which is specifically directed to a wind powered device designed to hold the boat on a selected heading or course relative to the apparent wind direction.

In the particular category of self-steering mechanisms for sport sailboats, some fairly effective and reliable systems have been developed in the past decade for achieving self-steering relative to the apparent wind direction. Such systems generally employ a wind vane to measure the apparent wind direction, and use the wind pressure on the wind vane, when the sailboat wonders off course, to drive a steering device that will steer the boat back to the desired course. In such systems, the steering device can be a sailboat's tiller, an auxiliary rudder or trim tab, a servo blade for amplifying power, or like means, depending upon the particular system used. Self-steering mechanisms of this general type, wherein wind vanes are employed to sense apparent wind direction, are disclosed in Gianoli U.S. Pat. Nos. 3,180,298 and 3,319,594, Ross-Clunis U.S. Pat. No. 3,678,878, Smith U.S. Pat. No. 3,942,461 and Saye U.S. Pat. No. 3,765,361.

Although effective to a degree, known self-steering mechanisms of the type described have not proved to be entirely satisfactory in use.

Wind vane units which pivot about an axis in response to changes in the direction of apparent wind wherein such axis is tiltable in a vertical plane with respect to the sailboat have been employed for purposes of varying the sensitivity of the wind vane. Assuming a wind vane is normally in a vertical position and pivots about a horizontal axis, it is known to decrease the effective leverage and power of the wind vane by tilting its axis out of a horizontal disposition so as for example to better operate in various types of wind and sea conditions. However, in order to convert angular vane deflections into linear movement for actuating an auxiliary rudder means, it has been necessary to employ rather cumbersome mechanical linkage when it is desired to utilize a vane having a tiltable axis.

In addition, it has been known to utilize a transmission intermediately disposed between a wind vane having a non-tiltable axis and an auxiliary rudder so as to vary the ratio therebetween. It has not been considered in the prior art to incorporate the advantages of a wind vane having a tiltable axis into a self-steering device having the advantages of a variable transmission means wherein the transmission means ratio could be adjusted independently of the wind vane axis tilt.

Lastly, it is known in the prior art to utilize an auxiliary rudder pivoted about a pendulum means wherein the latter is pivoted about an axis normal to the auxiliary rudder axis. In such an arrangement, vane movements are transmitted to the auxiliary rudder whereby the force of water flow past the deflected auxiliary rudder causes the pendulum to swing. Movement of the pendulum is transmitted by lines, cable or similar mechanisms to the main rudder of the boat in such a way as to cause the main rudder to correct the sailboat's heading relative to the wind. In such a structure, as set forth in applicant's aforesaid British patent, a gearing mechanism is employed to reduce the angle of the auxiliary rudder blade to water flow as the pendulum swings so as to provide a reducing force on the pendulum as it continues to swing. However, this structure necessitates the relatively more complex nature of the gearing referred to whereas the structure as set forth and claimed in the present invention eliminates the need for such gearing while still providing for reduction in the angle of incidence of the auxiliary rudder blade to water flow as the associated pendulum swings through the water.

SUMMARY OF THE INVENTION

Accordingly, it is a general object of the present invention to provide an improved wind powered self-steering device for sailboats.

It is a particular object of the present invention to provide a wind powered self-steering device for sailboats wherein use is made of a wind vane which is selectively tiltable for varying conditions of sea, wind point of sailing, and boat keel used, and which is structured to minimize the complexity of mechanical linkages related thereto.

It is another object of the present invention to provide a wind powered self-steering device having both a tiltably adjustable wind vane axis and a variable ratio transmission means for transmitting wind vane deflections to an auxiliary steering apparatus, such ratios being selected independently of the tilt selected for the wind vane axis.

It is still another object of the present invention to provide a pendulum type of self-steering device having an auxiliary rudder provided about said pendulum for controlling swinging movement of the pendulum. In this regard it is a further object to provide for reduction in the angle of incidence of the auxiliary rudder blade to water flow as the pendulum swings by mounting of the pendulum on a tilted axis.

It is another object of the invention to provide a wind powered self-steering device of such character wherein the wind vane can be initially employed in a trailing operation to establish a desired steering or course position and thereafter operated for steering corrections.

In summary, a wind powered self-steering device is provided which uses a wind vane to positively translate substantially all of the wind forces produced by the sailboat being off course into corrective movements of either an auxiliary rudder or an auxiliary rudder pendulum to return the sailboat to course. In regard to the wind vane unit, the device employs a support base attached to the sailboat, wherein the vane unit is mounted for pivotal movements about a vertical axis as respects the support base. More specifically, the vane unit includes mounting means disposed for pivotal movements about a horizontal axis on the support base and a wind vane lever means pivotally mounted on the mounting means on an axis which is coplanar with and perpendicular to the horizontal pivot axis of the wind vane mounting means. Means are provided to pivot the wind vane mounting means to selectively obtain varying angles of tilt of the pivot axis of the wind vane lever as may be needed for desired sensitivity with respect to differing weather conditions and type of keel used with the sailboat. The steering mechanism further includes a pivoted connection between the vane lever means and output shaft member for converting the vane deflections into linear movements, the axis of such connection being coplanar with the axis about which the vane mounting means pivots and the axis about which the vane lever means pivots when the vane is in a vertical disposition. The pivotal movements of the vane are translated into linear movements of the output shaft at a ratio of linear response of the output shaft to the pivotal vane motion which varies in proportion to the degree of tilt of vane axis.

The device of the present invention includes a transmission of variable ratio for transmitting linear movements of the aforesaid output shaft to an auxiliary rudder, the latter providing course adjustments to the sailboat. The ratio of the transmission can be set independently of the tilt provided to the vane axis whereby performance of the entire device of the present invention can be more precisely and easily determined.

The present invention further discloses the use of an auxiliary rudder pendulum disposed for pivoted motion about an axis tilted with respect to the horizontal surface of the sailboat. An auxiliary rudder is mounted on the pendulum for independent pivotal motion about its own axis which is oblique to the pendulum axis. With this arrangement, vane movement is transmitted to the auxiliary rudder blade and the force of water flow past the deflected auxiliary rudder blade causes the pendulum to swing on its tilted axis. The tilt of the pendulum axis reduces the angle of incidence of the auxiliary rudder blade to water flow as the pendulum continues to swing resulting in a reduction of force on the blade and reduction in further swinging movement of the pendulum. Such controlled movement of the pendulum on its tilted axis is in turn transmitted by cables or the like to the sailboat's main rudder in such a way as to cause the main rudder to pivot to correct the boat's heading relative to changes in apparent wind sensed by the wind vane.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

DETAILED DESCRIPTION OF THE INVENTION

Figures 1, 2, 3:
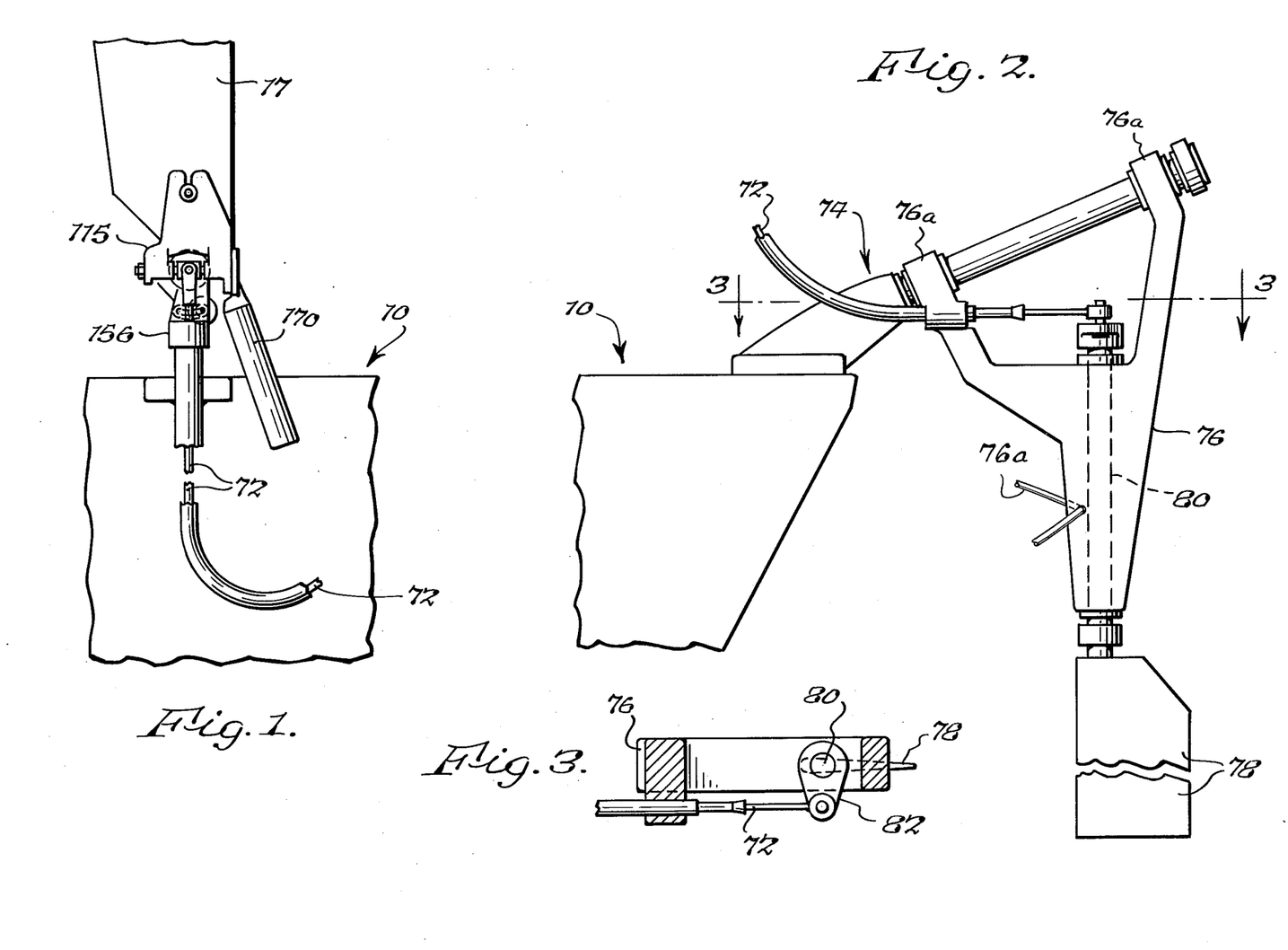
FIG. 1 is an isolated view in fragmentary form with portions broken away illustrating a wind vane unit pivoted about a tiltable axis whereby angular vane deflections are transmitted via a flexible cable to an auxiliary rudder assembly.
FIG. 2 is an isolated view in fragmentary form with portions broken away showing a pendulum body mounted for pivoted movement about an axis tilted with respect to the horizontal surface of a sailboat and further including an auxiliary rudder blade pivoted for movement on the pendulum about an axis oblique to the axis about which the pendulum is pivoted.
FIG. 3 is a transverse view partly in section taken about on line 3—3 of FIG. 2.
Figures 7, 8:
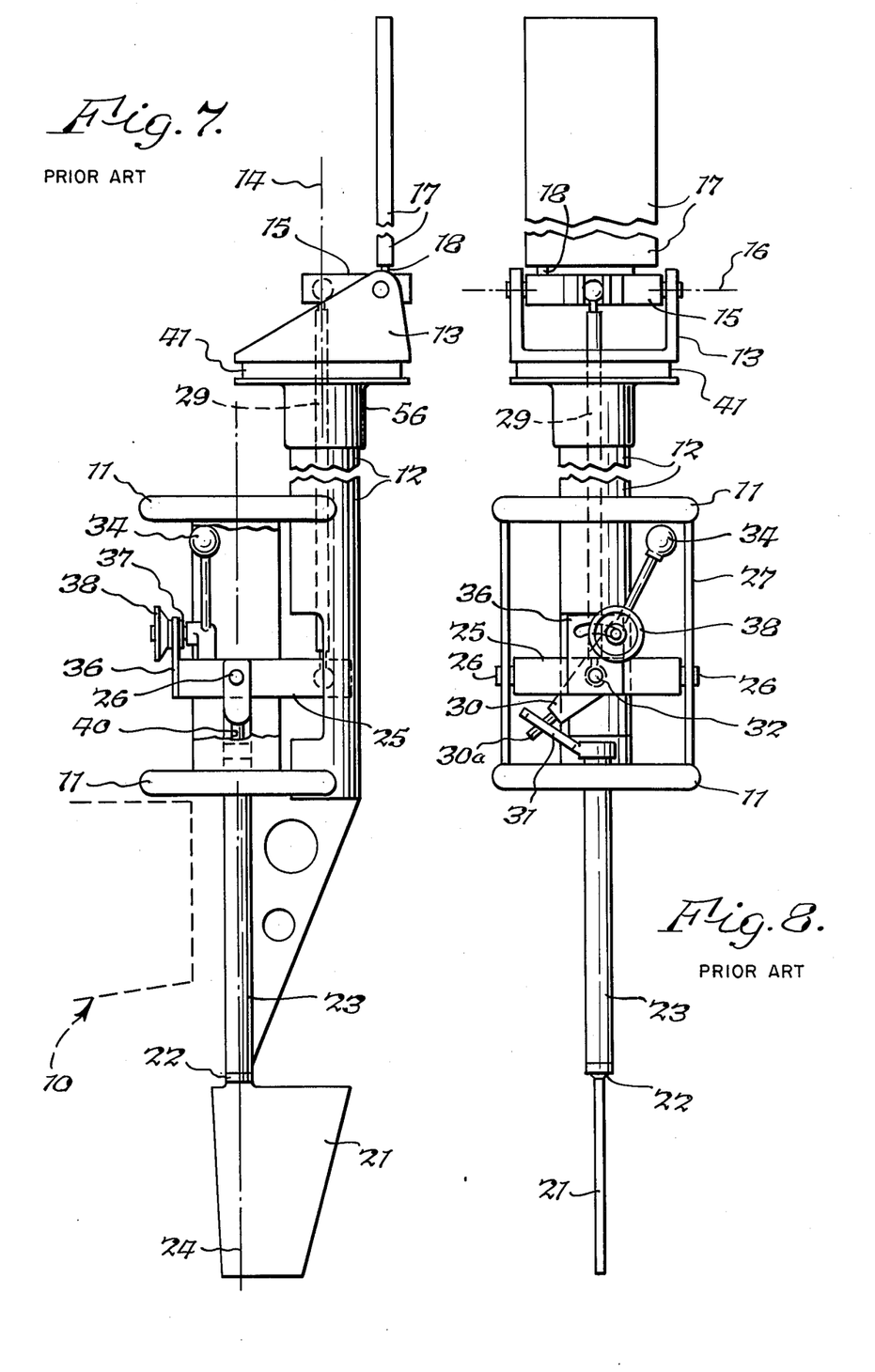
FIG. 7 is a side elevational view of one embodiment of the present invention as arranged to steer a sailboat on a course substantially at right angles to an apparent wind.
FIG. 8 is an end elevational view of the device as shown in FIG. 7.

The self-steering devices as illustrated in FIGS. 1, 2, 7 and 8 are intended to be attached to the stern of a sailing boat such as is indicated at 10 in FIGS. 2 and 7.

In FIGS. 7 and 8, a support is shown similar to that illustrated in applicant's British Pat. No. 1,326,020, published Aug. 8, 1973 comprising vertically spaced horizontal frame members 11 to which a vertically extending tubular mast 12 is secured. A support base upper portion 13 supported at the upper end of the mast 12 at a position well above the deck of the boat and the members 11. The support base is freely rotatable on the mast about the longitudinal axis 14 thereof and carries an upper lever subassembly generally indicated as 15 which is pivotally mounted on the support base portion 13, as to be described in more complete detail hereinbelow. As shown in FIGS. 7 and 8, subassembly 15 is disposed for pivotal movement about a horizontal axis 16 which is laterally offset from the longitudinal axis 14 of the mast. However, the present invention in part is directed to a novel structure whereby axis 16 and necessarily subassembly 15 can be tilted with respect to the horizontal.

In regard further to the general structural arrangement of the wind powered self-steering device considered herein, a wind vane 17 is rigidly mounted on the wind vane lever 15 at a position directly above the pivotal axis 16 by means of pins 18 on the wind vane lever which enter appropriate sockets in the wind vane. Although not shown, the upper extremity of the wind vane could further include a wind direction indicator which would be free to rotate relative to the wind vane for purposes of determining the direction of apparent wind.

The vane lever 15 forms a part of a transmission means for transmitting pivotal movement of the wind vane 17 to a rudder 21 of the boat as further shown in FIGS. 7 and 8. The rudder is rigidly secured to the lower end of a rudder shaft 22 which extends upwardly from the rudder through a lower one of the frame members 11 to a position just above such lower frame member. The rudder shaft is mounted in a rudder tube 23 for rotation relative thereto about a vertical rudder axis 24, and the rudder tube is rigidly secured to the lower of the frame members 11.

The transmission means also includes a motion transfer member in the form of a lever 25 which is disposed between the frame members 11 and is mounted by means of pivots 26 on the side plates 27 which extend between the frame members 11, and of which one is omitted from FIG. 7 for clarity. The pivotal axis of the lever 25 is parallel to the illustrated axis 16 of the vane lever 15, and is also laterally offset from the longitudinal axis 14 of the mast.

The vane lever 15 and lever 25 are interconnected by a connecting rod 29 which extends generally along the longitudinal axis 14 of the mast so that pivotal movement of the vane lever 13 causes a corresponding pivotal movement of the lever 25.

The support base portions 13 and 56 are mounted on the mast 12 for rotation relative thereto to permit setting of the wind vane structure as determined by the course which it is required to sail. Accordingly, at least one, and preferably as shown both, of the upper and lower ends of the connecting rod 29 is connected with its respective lever by a joint, such as a ball joint.

An adjustable operative connection between the lever 25 and the rudder shaft 22 is provided by an adjustable member 30 in cooperation with a rudder arm 31. The adjustable member 30 is mounted on the lever 25 for angular adjustment relative thereto about pivot points 32 which lie on an axis which is perpendicular to and which is intersected by the axis about which lever 25 is mounted. The rudder axis 24 passes through this intersection point. The rudder arm 31 is rigidly secured to the rudder shaft 22 at the upper end thereof and extends radially upwardly from the shaft.

The adjustable member 30 includes a first arm 33 which carries a handle 34 by means of which the adjustable member can be pivoted about pins 32, and a pin 35 which projects from the arm 33 in a direction parallel to the axial orientation of pins 32 and at a position laterally offset therefrom. The pin 35 extends through a curved slot provided in a vertical plate 36 which is attached to the lever 25. A flanged sleeve 37 surrounds the pin 35 and extends through the curved slot, the flange engaging portions of the plate 36 adjacent to the curved slot. The sleeve 37 is prevented from rotating on pin 35 in any convenient manner and a portion of the sleeve on the side of the plate 36 remote from the flange is threadedly engaged with a hand wheel 38. The plate 36 can be clamped between the flange of the sleeve 37 and the hand wheel by rotation of the latter to secure the adjustable member 30 releasably in a selected position of angular adjustment relative to the lever 25. The adjustable member 30 further includes an arm portion 30a which extends at right angles to the axial orientation of pins 32, conveniently in a direction opposite that of arm 33. Arm portion 30a is engaged in a slot 40 formed in the rudder arm 31.

The slot 40 is straight when viewed along the axis of rudder shaft 22 and extends therethrough. Thus, in one extreme position of adjustment of the adjustable member 30, the arm 30a extends vertically downwards in a coaxial manner with respect to the axis of rudder shaft 22. When the adjustable member is in this extreme position, the rudder 21 is free to rotate independently of the wind vane 17, that is without transmitting any movement thereto, and the self-steering gear is not effective to steer the boat. Also, with the adjustable member 30a in this extreme position, the wind vane is locked in a vertical datum position by engagement of the arm with the inner end of slot 40.

When the adjustable member 30 and the arm 30a are in any position of adjustment other than the extreme position referred to hereinabove, pivotal movement of the vane 17 about the axis 16 is transmitted by means of the vane lever 15, the connecting rod 29, the lever 25, the arm 30a and the rudder arm 31 to the rudder shaft 22. The velocity ratio or gear ratio of this transmission means can be varied steplessly by suitable adjustment of the member 30 about pins 32. Thus, the gear ratio may be varied to suit particular conditions of use of the self-steering device.

The adjustment means described is effective to change the value of both the effective length of the arm position 30a and the effective length of the rudder arm 31. In other words the radial distances of the point of contact between these two arms from the axis extending between pins 26 on the one hand and from the rudder axis 24 on the other hand are both changed by angular adjustment of the member 30. However, the geometry of the adjustment means may be such as to vary only one of these distances. For example, the rudder arm may extend at right angles to the rudder axis 24. In this case angular adjustment of the member 30 would vary the effective length of the rudder arm, but would not vary the effective length of arm portion 30a. Although one exemplary construction of the aforesaid transmission means has been described, it would be obvious to one skilled in the art that various modifications to this structure could be made while still performing the same function.

Figures 4, 5, 6:
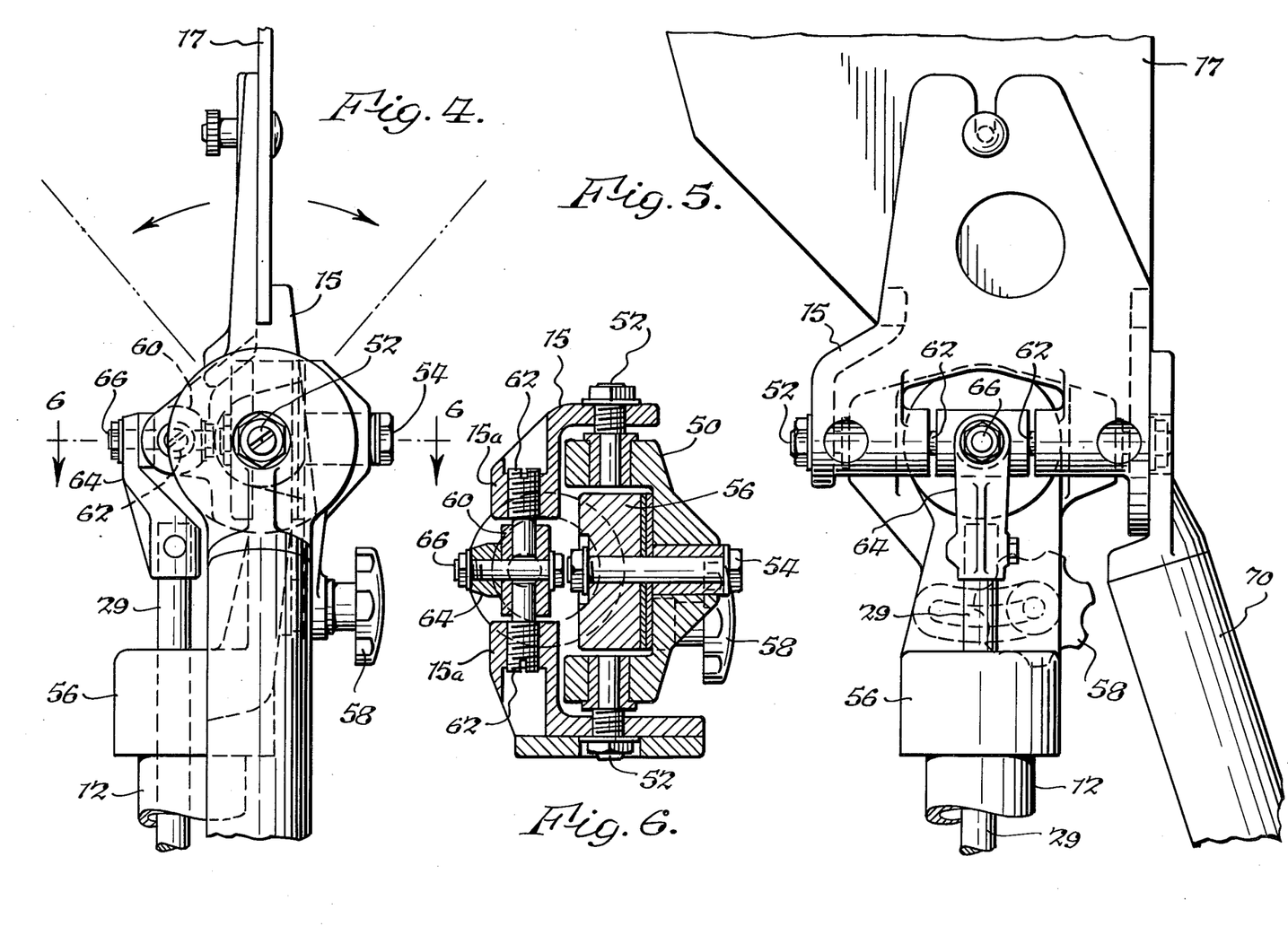
FIG. 4 is an isolated view with portions broken away of the leading edge of a wind vane illustrating an indicated range of pivotal movement and as supported by a unit providing for adjustable tilt of the vane pivot axis.
FIG. 5 is a side view in elevation of the vane unit as shown in FIG. 4.
FIG. 6 is a transverse view in section of the vane unit as taken about on line 6—6 of FIG. 4.

Turning now to a consideration of FIGS. 4 through 6, there is shown in detail the structure employed whereby the axis 16 about which the wind vane 17 and associated vane lever subassembly 15 pivot may be inclined or tilted in a selected manner with respect to the horizontal. The desirability of this feature (adjustment of the wind vane sensitivity) will be described in detail hereinbelow in connection with the operation of applicant's structure. As shown in FIGS. 4 and 6, the vane 17 is rigidly affixed to the vane lever means 15 with the latter being pivoted for rotation about a wind vane mounting means 50 or more specifically a mounting means for and comprising part of the lever means 15. The mounting means 50 in turn is mounted for rotation about the pin assembly 54 with respect to the lower support base portion 56.

The pin assembly 54 therefore provides a horizontal pivot axis about which the mounting means 50 may pivot. It is accordingly to be understood with respect to FIGS. 7 and 8, that the vane lever and its associated pivot axis may pivot with respect to the horizontal about the upper end of connecting rod 29, although the detail structure such as mounting means 50 and the pin assembly 54 are not shown in FIGS. 7 and 8 for purposes of clarity in those views. Returning to FIGS. 4 through 6, it is to be understood that the wind vane lever pivot axis is coplanar with and perpendicular to the horzontal pivot axis associated with the pin assembly 54. In addition, a locking hand wheel or knob 58 is provided adjacent to the lower support base portion 56 to releasably adjust or determine the degree of tilt imparted to the mounting means 50 and correspondingly the associated wind vane pivot axis 16 with respect to the support base.

As shown further in detail in FIG. 6, the left hand side of the vane lever 15 includes a bushing type means 60 which is pivotally mounted in the gap between portions 15a of the vane lever by means of opposing, partially threaded pins 62. The axis is associated with pins 62 is parallel to the axis associated with pins 52. The bushing 60 is pivotally connected to connecting arm 64, the latter providing an operable connection between lever 15 and the output shaft or connecting rod 29. The connection between bushing 60 and arm 64 is provided by pin 66, perpendicular to pins 62, which passes transversely through bushing 60 whereby the latter may pivot freely about the longitudinal axis of pin 66 with lever 15, the lever axis 16, and mounting means 50 pivoted as an integral unit also about the pin assembly 54 with respect to the lower base portion 56 and upper support base portion.

Accordingly, as shown in FIGS. 4 through 6, it should be apparent that when the vane is in a vertical datum position all of the axes associated with pins 52, 54, 62 and 66 are coplanar at all angles of tilt of the vane axis and that as further shown in FIG. 6, when the vane 17 is in a vertical datum position the axis of pin 66 is coaxial with that of pin 54 and both of these axes in turn being perpendicular to the axis associated with pins 52. It should be further appreciated, that the ratio of linear movements in a vertical direction of the output shaft or connecting rod 29 to the angular pivotal movements of the wind vane 17 and associated lever 15 will vary in correspondence to the degree of tilt of the wind vane lever pivot axis with respect to the support base. In other words, the lever 15 will transmit the relatively greatest amount of vertical movement to rod 29 when the pivot axis for lever 15 is horizontal. However, as the pivot axis for lever 15 is tilted with respect to the horizontal, with the bushing 60 pivoting about pin 66, a certain degree of the pivotal movement of lever 15 will be converted to transverse movements of connecting rod 29 with a decreasing portion of the movement of lever 15 being converted into vertical movement of the rod 29 as the axis of lever 15 is tilted farther away from the horizontal.

Turning now to a consideration of FIGS. 1 and 3, another aspect of the present invention will be described. As shown in FIG. 1, a wind vane unit as described in FIGS. 4 through 6 may be mounted on the deck of a sailboat remote from the auxiliary steering apparatus. As shown in FIG. 1, the vane 17 is mounted to a support base 156 whereby the pivotal axis of the vane may be tilted with respect to base 156 by means of the structure described in the aforesaid FIGS. 4 through 6. It is to be noted that a counter weight 170 is affixed to the vane lever subassembly 115 just as the counter weight 70 is affixed to lever 15 in FIG. 5. The purpose of the aforesaid counter weights is to urge the wind vane towards its datum position as changes in apparent wind subside.

With respect to FIGS. 1 and 2, pivotal movement of the vane 17 is converted into axial movements of the bowden cable or wire 72. Necessarily, as in the case with connecting rod 29, the amount or degree o axial movements of cable 72 decreases in proportion to the pivotal movement of the wind vane as the axis of the latter is tilted farther and farther away from the horizontal. The movements of the cable 72 are transmitted to the auxiliary steering rudder means shown in FIG. 2. The auxiliary steering rudder means includes a support means 74 attached to the stern of the sailboat wherein the support means extends in an outboard direction relative to the stern and includes an axis disposed at an angle to the horizontal. A pendulum body 76 is mounted on the support means 74 for pivoted movement thereabout by means of the pivoted connections 76a. An auxiliary rudder 78 is mounted in a pivoted manner on the pendulum 76 by means of the vertically disposed auxiliary rudder shaft 80 as shown in FIG. 2. The upper end of the shaft 80, as viewed in detail in FIG. 3, is connected to the end of the bowden cable 72 by means of a pivot arm 82 so that axial movement of the cable 72 results in pivotal or rotational movement of the auxiliary rudder shaft 80. It is to be appreciated therefore, that axial movement of cable 72 will pivot the auxiliary rudder 78 in a corresponding direction which will tend to swing the pendulum 76 in a corresponding direction about the axis of the support means 74 as the sailboat passes through the water.

The operation of applcant's invention will first be described with respect to the operation of the tiltable wind vane as shown in FIGS. 4 through 6 in combination with a variable ratio transmission and auxiliary steering rudder as generally shown in FIGS. 7 and 8. The support base portions 56 and 13 form part of a course setting mechanism which may be provided with a peripheral groove such as 41 shown in FIGS. 7 and 8 to accept a line by means of which the rotational position of the support base can be controlled from a remote position. Necessarily, alternative means could be provided for this function.

When the boat is on the required course the support base is rotated so that the wind vane lever axis 16 about which the vane 17 pivots is parallel to the direction of the apparent wind. The wind vane then remains in a vertical datum position until there is a change in direction of the apparent wind, such as would be caused by a deviation of the boat from the required course. This causes the wind vane to move from its datum position by pivoting about the axis 16. Such pivotal movement is transmitted to the auxiliary rudder 21 which is caused to pivot in a direction such as to counteract the deviation and steer the sailboat onto or more nearly onto its original course relative to the wind. When the wind vane returns to its datum position the auxiliary rudder 21 will return to a central position parallel to the fore and aft center line of the hull. In addition, the tilt angle of the wind vane at any point in time may be adjusted by means of knob 58. As the vane axis is tilted farther and farther away from the horizontal, the effective moment arm of the vane with respect to imparting vertical movements to connecting rod 29 decreases. To those skilled in the art, this characteristic of the wind vane is known as its sensitivity. Accordingly, when the self-steering device is utilized in heavy seas or strong wind, the vane axis may be tilted to decrease its sensitivity to accomodate such condition. In addition, it is known to employ relatively short keels on high performance sailboats with a view towards reducing sailboat drag. With such a sailboat, it is a distinct possibility that a user of the instant invention would want to decrease the sensitivity of the vane so that the auxiliary rudder does not tend to overcorrect, in view of a relatively short keel, which could result in undesirable yawing of the boat. Furthermore, it is considered a distinct advantage of applicant's invention that a variable ratio transmission, as described in FIGS. 7 and 8, be provided so that the ratio of auxiliary rudder movement to vane movement can be independently selected in addition to independent selection of the vane sensitivity. It is believed that by such an arrangement, a user of the instant device may most precisely adapt the self-steering device to weather and boat conditions. Furthermore, it is believed that the arrangement of mechanical linkage as described with respect to FIG. 6 effectively provides the capabilities described hereinabove while avoiding the necessity of unduly complex mechanical structure as exists in prior art structures.

In regard to the operation of the self-steering device as illustrated in FIGS. 1 through 3, it is to be understood that the sensitivity of the wind vane may be independently set in a manner as described immediately hereinabove. One of the additional advantages of this structure, is that the wind vane unit does not have to be placed at the stern of the sailboat but may be mounted at any convenient location. When the vane 17 is in a vertical datum position, the pendulum 76 lies in substantially a vertical plane with respect to the boat, the auxiliary rudder 78 being oriented parallel to the fore and aft center line of the sailboat. As the wind vane undergoes a deflection, cable 72 urges the auxiliary rudder 78 to pivot in a corresponding direction and the force of water flow past the deflected auxiliary rudder 78 causes the pendulum 76 to swing in a corresponding direction about the tilted axis of support 74. The tilting, with respect to the horizontal, of the axis about which the pendulum pivots results in a reduction in the angle of incidence of the auxiliary rudder blade to water flow. With the wind vane maintained at any given angle of deflection, the auxiliary rudder 78 is necessarily maintained at a corresponding angle of pivoted rotation with respect to the pendulum body 76. However, as the pendulum 76 continues to swing about its tilted axis, the angle of incidence of the auxiliary rudder with respect to the water flow continues to reduce, resulting in a reducing force on the auxiliary rudder and necessarily a reduction in the force tending to urge the pendulum to swing further. Accordingly, it is to be understood that at some point in the pendulum swing, the angle of incidence of the auxiliary blade with the water will approach zero and the pendulum will swing no further but will be retained in such disposition until the wind vane and auxiliary rudder move so as to determine further corresponding movement of the pendulum. In regard to the pendulum imparting corrective steering to a sailboat, lines 76a or a cable are attached to the pendulum body 76 in such a way as to cause the main steering rudder of the sailboat to correct the boat's heading relative to the wind. Accordingly, the auxiliary steering rudder 78 not only provides corrective steering movements itself but also controls such corrective movements through its effect on the pendulum body 76 wherein the latter urges the main steering rudder to provide much more effective and additional corrective movements. The principal advantage of the structure shown in FIG. 2 over prior art devices is the fact that use of a tilted axis for pendulum movement automatically reduces the angle of incidence of the auxiliary rudder as the pendulum swings—so that pendulum movement takes place in a controlled manner. Absent use of the tilted axis for the pendulum, it would be necessary to employ relatively complicated transmission apparatus so as to ensure that the angle of incidence of the auxiliary rudder with the water would reduce as the pendulum undergoes swinging movement so that the latter takes place in a controlled manner. Necessarily, use of cable 72 and the pivot arm 82 as shown in FIG. 3 is relatively simple, inexpensive and relatively maintenance free in comparison to gearing or transmission apparatus which would otherwise be necessary.

From the foregoing, it is apparent that the objects of the present invention have been fully accomplished. As a result of this invention, an improved self-steering device is provided having a wind vane sensitivity which is adjustable independently from a variable ratio transmission which operably connects the wind vane to an auxiliary steering rudder. Furthermore, the mechanical linkage employed to provide a tiltable vane axis is efficient in operation and relatively compact in form. Lastly, a pendulum type of auxiliary steering means is provided which utilizes a tilted axis about which the pendulum pivots. In this manner, the overall structure of the unit is simplified while still providing the full operational capability of prior art structures.

Having thus described and illustrated my invention, it will be understood that such description and illustration is by way of example only and that such modifications and changes as may suggest themselves to those skilled in the art are intended to fall within the scope of the present invention as limited only by the appended claims.

I claim:

1. In a wind powered self-steering device for a sailboat having a keel, main steering rudder and an auxiliary steering rudder, a support base attached to said sailboat, a wind vane unit mounted for pivotal movements about a vertical axis with respect to said support base, said wind vane unit comprising a wind vane mounting means disposed for pivotal movement about a horizontal pivot axis carried by said support base, a wind vane lever means including a wind vane lever pivot axis carried by said wind vane mounting means, a wind vane affixed to said wind vane lever means, means to pivot said wind vane mounting means and correspondingly said wind vane lever pivot axis with respect to said support base so as to selectively adjust the angular tilt between said wind vane lever pivot axis and said support base, an output shaft operably connected to said wind vane lever means, said wind vane lever means operable at different angles of tilt of said wind vane lever pivot axis with respect to said support base to translate pivotal movements of said wind vane lever means about said wind vane lever pivot axis to linear movements of said output shaft, the ratio of said linear movements of said output shaft to said pivotal movements of said wind vane lever means varying in correspondence to the degree of tilt of said wind vane lever pivot axis with respect to said support base, and transmission means operably connected between said output shaft and said auxiliary rudder for transmitting the movements of said output shaft into pivotal steering movements of said auxiliary rudder whereby said wind vane and wind vane lever means can be set at a desired steering angle or course and at a desired tilt angle with respect to said support base for keel, wind and sea conditions, and thereafter operated to positively translate all wind forces produced by said sailboat being off course into corrective movements of said auxiliary rudder to return said sailboat to course wherein said transmission means includes settable means for adjusting the ratio of movements between said output shaft and said pivotal movement of said auxiliary rudder, said settable means being operative independently of said wind vane unit.

2. In a wind powered self-steering device as set forth in claim 1 wherein said wind vane lever pivot axis is coplanar with and perpendicular to said horizontal pivot axis associated with said support base and said wind vane mounting means.

3. In a wind powered self-steering device as set forth in claim 2 wherein said wind vane lever means is connected to said output shaft by a pivoted connection, the axes of which are coplanar with said horizontal pivot axis associated with said support base and said wind vane mounting means when said wind vane is in a vertical disposition.

4. In a wind powered self-steering device as set forth in claim 2 wherein said wind vane lever means is connected to said output shaft by a pivoted connection having one axis which is coaxial with said horizontal pivot axis associated with said support base and said wind vane mounting means and a second axis which is perpendicular to said horizontal pivot axis associated with said support base and said wind vane mounting means when said wind vane is in a vertical disposition.

5. In a wind powered self-steering device as set forth in claim 2 wherein said wind vane lever means is connected to said output shaft by a pivoted connection so that when said wind vane is in a vertical disposition the axes of said pivoted connection are coplanar with said horizontal pivot axis associated with said support base and said wind vane mounting means with one of said pivoted connection axes being coaxial with said horizontal pivot axis associated with said support base and said wind vane mounting means and a second of said pivoted connection axes being perpendicular to said horizontal pivot axis associated with said support base and said wind vane mounting means.

6. In a wind powered self-steering device as set forth in claim 1 wherein said wind vane lever means is connected to said output shaft by a pivoted connection the axes of which are coplanar with said horizontal pivot axis associated with said support base and said wind vane mounting means when said wind vane is in a vertical disposition.

7. In a wind powered self-steering device as set forth in claim 1 wherein said wind vane lever means is connected to said output shaft by a pivoted connection having one axis which is coaxial with said horizontal pivot axis associated with said support base and said wind vane mounting means and a second axis which is perpendicular to said horizontal pivot axis associated with said support base and said wind vane mounting means when said wind vane is in a vertical disposition.

8. In a wind powered self-steering device as set forth in claim 1 wherein said wind vane lever means is connected to said output shaft by a pivoted connection so that when said wind vane is in a vertical disposition the axes of said pivoted connection are coplanar with said horizontal pivot axis associated with said support base and said wind vane mounting means with one of said pivoted connection axes being coaxial with said horizontal pivot axis associated with said support base and said wind vane mounting means and a second of said pivoted connection axes being perpendicular to said horizontal pivot axis associated with said support base and said wind vane mounting means.

9. In a wind powered self-steering device for a sailboat having a keel, main steering rudder and an auxiliary steering rudder means mounted separately from said main steering rudder and being in operable connection therewith, a wind vane unit mounted for pivotal movements about a vertical axis with respect to said sailboat, said wind vane unit comprising a wind vane lever means and a wind vane in operable connection with said wind vane lever means, transmission means operably connected between said wind vane lever means and said auxiliary steering rudder means for transmitting pivotal movements of said wind vane and wind vane lever means to said auxiliary steering rudder means, said auxiliary steering rudder means comprising support means attached to said sailboat extending in an outboard direction relative thereto and having an axis at an angle to the horizontal with respect thereto, a pendulum body mounted on said support means for pivoted movement thereabout, an auxiliary rudder mounted in a pivoted manner on said pendulum body with said transmission means operable to pivot said auxiliary rudder about its own axis in response to pivotal movements of said wind vane and wind vane lever means so that said pendulum body pivots bodily about said support means as said sailboat undergoes movement through the water, and means for transmitting bodily movement of said pendulum body about said support means axis to said main steering rudder whereby said wind vane unit can be set at a desired steering angle or course and thereafter operated to positively translate all wind forces produced by said sailboat being off course into corrective movements of said auxiliary steering rudder means to return said sailboat to course.

10. In a wind powered self-steering device for a sailboat as set forth in claim 9 wherein the axis about which said auxiliary rudder pivots is oblique to the axis of said support means.

11. In a wind powered self-steering device for a sailboat as set forth in claim 10 further including a support base attached to said sailboat with said wind vane unit mounted for pivotal movements about a vertical axis with respect to said support base, said wind vane unit including a wind vane mounting means disposed for pivotal movement about a horizontal pivot axis carried by said support base, said wind vane lever means including a wind vane lever pivot axis carried by said wind vane mounting means, means to pivot said wind vane mounting means and correspondingly said wind vane lever pivot axis with respect to said support base so as to selectively adjust the angular tilt between said wind vane lever pivot axis and said support base, an output shaft operably connected to said wind vane lever means with said wind vane lever means being operable at different angles of tilt of said wind vane lever pivot axis with respect to said support base to translate pivotal movements of said wind vane lever means about said wind vane lever pivot axis to linear movements of said output shaft, the ratio of said linear movements of said output shaft to said pivotal movements of said wind vane lever means varying in correspondence to the degree of tilt of said wind vane lever pivot axis with respect to said support base, and said transmission means being operably connected between said output shaft and said auxiliary steering rudder means for transmitting the movements of said output shaft into pivotal movements of said auxiliary rudder.

12. In a wind powered self-steering device for a sailboat as set forth in claim 11 wherein said wind vane lever pivot axis is coplanar with and perpendicular to said horizontal pivot axis associated with said support base and said wind vane mounting means.

13. In a wind powered self-steering device for a sailboat as set forth in claim 9 wherein the axis of said support means is disposed at an angle above the horizontal in extending in an outboard direction with respect to said sailboat.

14. In a wind powered self-steering device for a sailboat as set forth in claim 13 wherein the axis of said auxiliary rudder is vertically disposed when said pendulum body lies in a vertical plane with respect to said sailboat.

15. In a wind powered self-steering device for a sailboat as set forth in claim 14 further including a support base attached to said sailboat with said wind vane unit mounted for pivotal movements about a vertical axis with respect to said support base, said wind vane unit including a wind vane mounting means disposed for pivotal movement about a horizontal pivot axis carried by said support base, said wind vane lever means including a wind vane lever pivot axis carried by said wind vane mounting means, said wind vane lever pivot axis being coplanar with and perpendicular to said horizontal pivot axis associated with said support base and said wind vane mounting means, means to pivot said wind vane mounting means and correspondingly said wind vane lever pivot axis with respect to said support base so as to selectively adjust the angular tilt between said wind vane lever pivot axis and said support base, an output shaft operably connected to said wind vane lever means with said wind vane lever means being operable at different angles of tilt of said wind vane lever pivot axis with respect to said support base to translate pivotal movement of said wind vane lever means about said wind vane lever pivot axis to linear movements of said output shaft, the ratio of said linear movements of said output shaft to said pivotal movements of said wind vane lever means varying in correspondence to the degree of tilt of said wind vane lever pivot axis with respect to said support base, and said transmission means being operably connected between said output shaft and said auxiliary steering rudder means for transmitting the movements of said output shaft into pivotal movements of said auxiliary rudder.

* * * * *